United States Patent [19]

Shrock

[11] Patent Number: 5,584,028
[45] Date of Patent: Dec. 10, 1996

[54] METHOD AND DEVICE FOR PROCESSING MULTIPLE, ASYNCHRONOUS INTERRUPT SIGNALS

[75] Inventor: Eugene L. Shrock, Castle Rock, Colo.

[73] Assignees: AT&T Global Information Solutions Company, Dayton, Ohio; Hyundai Electronics America, Milpitas, Calif.; Symbios Logic Inc., Fort Collins, Colo.

[21] Appl. No.: 966,620

[22] Filed: Oct. 26, 1992

Related U.S. Application Data

[63] Continuation of Ser. No. 523,491, May 14, 1990, abandoned.

[51] Int. Cl.$^6$ ............................... G06F 9/46; G06F 13/24
[52] U.S. Cl. .................... 395/735; 395/868; 395/736; 364/DIG. 1; 364/230; 364/230.2; 364/241.2
[58] Field of Search ................................ 395/725, 325, 395/275, 733, 735, 736, 740, 867, 868

[56] References Cited

U.S. PATENT DOCUMENTS

| | | | |
|---|---|---|---|
| 3,543,242 | 11/1970 | Adams, Jr. ................................ | 395/725 |
| 3,597,743 | 8/1971 | Murphy .................................... | 395/822 |
| 3,699,530 | 10/1972 | Capawski et al. ....................... | 395/859 |
| 3,829,839 | 8/1974 | Jeane ....................................... | 395/725 |
| 3,921,145 | 11/1975 | Emm et al. ............................... | 395/725 |
| 4,023,143 | 5/1977 | Braunstein .............................. | 395/725 |
| 4,028,667 | 7/1977 | Breslau et al. ...................... | 395/200.06 |
| 4,041,460 | 8/1977 | Wisdom et al. ..................... | 395/185.06 |
| 4,080,649 | 3/1978 | Calle et al. .............................. | 395/868 |
| 4,091,447 | 5/1978 | Dillon et al. ............................. | 395/737 |
| 4,153,934 | 5/1979 | Sato .......................................... | 395/650 |
| 4,215,395 | 7/1980 | Bunyard et al. ......................... | 364/134 |
| 4,215,399 | 7/1980 | Pavicic et al. ........................... | 364/136 |
| 4,220,990 | 9/1980 | Alles ........................................ | 395/550 |
| 4,393,470 | 7/1983 | Miard ....................................... | 395/775 |
| 4,404,648 | 9/1983 | Miyakawa et al. ...................... | 395/200 |
| 4,420,806 | 12/1983 | Johnson, Jr. et al. .................. | 395/725 |
| 4,494,192 | 1/1985 | Lew et al. ................................ | 395/292 |
| 4,626,987 | 12/1986 | Renninger ................................ | 395/725 |
| 4,630,041 | 12/1986 | Casamatta et al. ..................... | 395/725 |
| 4,689,739 | 8/1987 | Federico et al. ........................ | 395/725 |
| 4,734,882 | 3/1988 | Romagosa ................................ | 395/725 |
| 4,740,915 | 4/1988 | Bonitz et al. ............................ | 395/725 |
| 4,799,148 | 6/1989 | Nishioka ................................... | 395/725 |
| 4,835,672 | 5/1989 | Zenk et al. ............................... | 395/725 |
| 5,038,275 | 8/1991 | Dujari ....................................... | 395/725 |
| 5,043,882 | 8/1991 | Ikeno ........................................ | 395/725 |

*Primary Examiner*—Ayaz R. Sheikh
*Attorney, Agent, or Firm*—Wayne P. Bailey; Douglas S. Foote

[57] ABSTRACT

A device and method for processing a plurality of asynchronous interrupt signals provided to respective primary registers. The first provided of the signals is stored in a primary register. The primary registers are then closed to subsequently provided signals. Notice is provided of receipt of the first signal, and the primary registers are read to identify the first signal. Interrupt signals received after the primary registers are closed are stored in secondary registers.

22 Claims, 4 Drawing Sheets

METHOD AND DEVICE FOR PROCESSING MULTIPLE, ASYNCHRONOUS INTERRUPT SIGNALS

This is a continuation of U.S. patent application Ser. No. 523,491 filed on May 14, 1990, now abandoned.

The present invention relates to the processing of interrupt signals. More particularly, it relates to a method and device for capturing and processing multiple interrupt signals which may occur asynchronously to one another.

BACKGROUND OF THE INVENTION

Data processing systems often have numerous subsystems which operate concurrently and in many cases independently of a central processor. However, many situations can arise which require the attention of the processor. In order that such situations are addressed, the processor's currently executing program is interrupted by means of an "interrupt" signal being transmitted by the troubled subsystem. The processor then typically intervenes to determine the source of the interrupt and to take appropriate action to "service" the interrupt. After the interrupt is serviced, the processor can resume the execution of its program. Typical interrupts may occur as a result of a hardware error such as power failure or a data parity error or as a result of a software error such as an overflow condition.

Interrupts can occur asynchronously with respect to one another and with respect to a system clock. Multiple interrupts can also arise while other interrupts are being serviced. Not all interrupts have the same degree of urgency. For example, a power failure may be more critical and require prompter attention than a parity error. Multiple, asynchronously occurring interrupts with differing priority levels require a system that can capture and efficiently handle all such interrupts.

OBJECTS OF THE INVENTION

It is therefore an object of the present invention to provide a new and improved device for managing multiple, asynchronous interrupt signals.

It is another object of the present invention to provide a new and improved method for processing a number of asynchronous interrupt signals.

It is a further object of the present invention to provide a device and method which provides both pollable and non-pollable options of identifying an interrupt.

It is yet another object of the present invention to provide a device and method for handling multiple interrupts which occur simultaneously.

It is yet a further object of the present invention to provide a device and method which allows interrupts to be detected during the processing of previously occurring interrupts.

SUMMARY OF THE INVENTION

One form of the present invention is a device for managing multiple asynchronous interrupt signals transmitted on a plurality of signal lines. The device includes a plurality of primary registers, a decoder, means for reading the registers and a controller. Each register has an input for receiving an interrupt signal, a control gate for controlling the storage of the signal in the register, and an output for providing the stored signal. The decoder is connected between the output and gate of each register for providing notice of a stored signal and for closing the gates in response to the stored signal. The reading means is connected to the outputs and is responsive to a read signal for reading the registers, and the controller is connected to the decoder for receiving the read signal and for signaling the decoder to open the registers.

Another form of the invention is a method for processing a plurality of asynchronous interrupt signals provided to respective primary registers. The first provided of the signals is stored in a primary register. The primary registers are then closed to subsequently provided signals. Notice is provided of receipt of the first signal, and the primary registers are read to identify the first signal.

DESCRIPTION OF A PREFERRED EMBODIMENT

Figure 1:
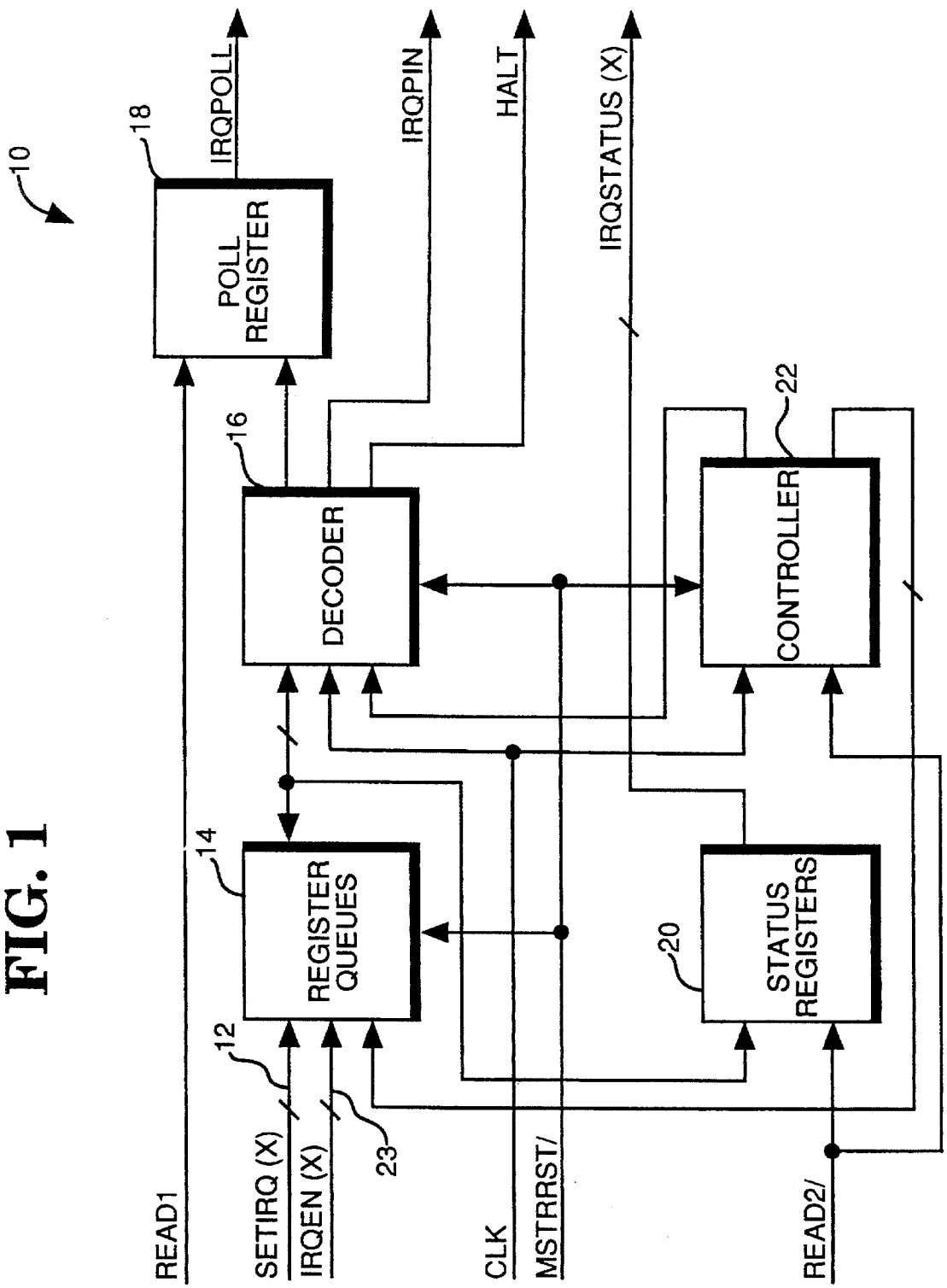
FIG. 1 is a block diagram of a device for managing interrupt signals according to one form of the present invention.

FIG. 1 shows a device 10 for managing multiple asynchronous interrupt signals SETIRQ(X) transmitted on lines 12. The notation "(X)" following a signal name indicates that a number of such signals are provided on respective individual lines. Device 10 includes register queues 14, a decoder 16, poll register 18, status registers 20 and controller 22. Device 10 is normally associated with a host processor and acts as an interrupt signal interface between various subsystems and the processor. Thus, the interrupt signals SETIRQ(X) are received from various subsystems, the system clock signal CLK and master reset signal MSTRRST/normally originate from the processor, and the interrupt signal IRQPIN is provided to the processor. The IRQEN(X) signals are associated on a one-to-one basis with the interrupt signals SETIRQ(X) and may be provided on lines 23 to selectively mask predetermined ones of said SETIRQ(X) signals. The halt signal HALT is a secondary interrupt that is generated in response to a so-called "fatal interrupt", such as a power failure, and may be made available to the processor or any subsystem needing the information. Read signal READ1 is provided by the processor to poll register 18, and read signal READ2 is provided by the system processor to status registers 20 and controller 22, as will be explained more fully. The signal IRQPOLL and signals IRQSTATUS(X) are provided to the processor in response to READ1 and READ2, respectively.

Figure 2:
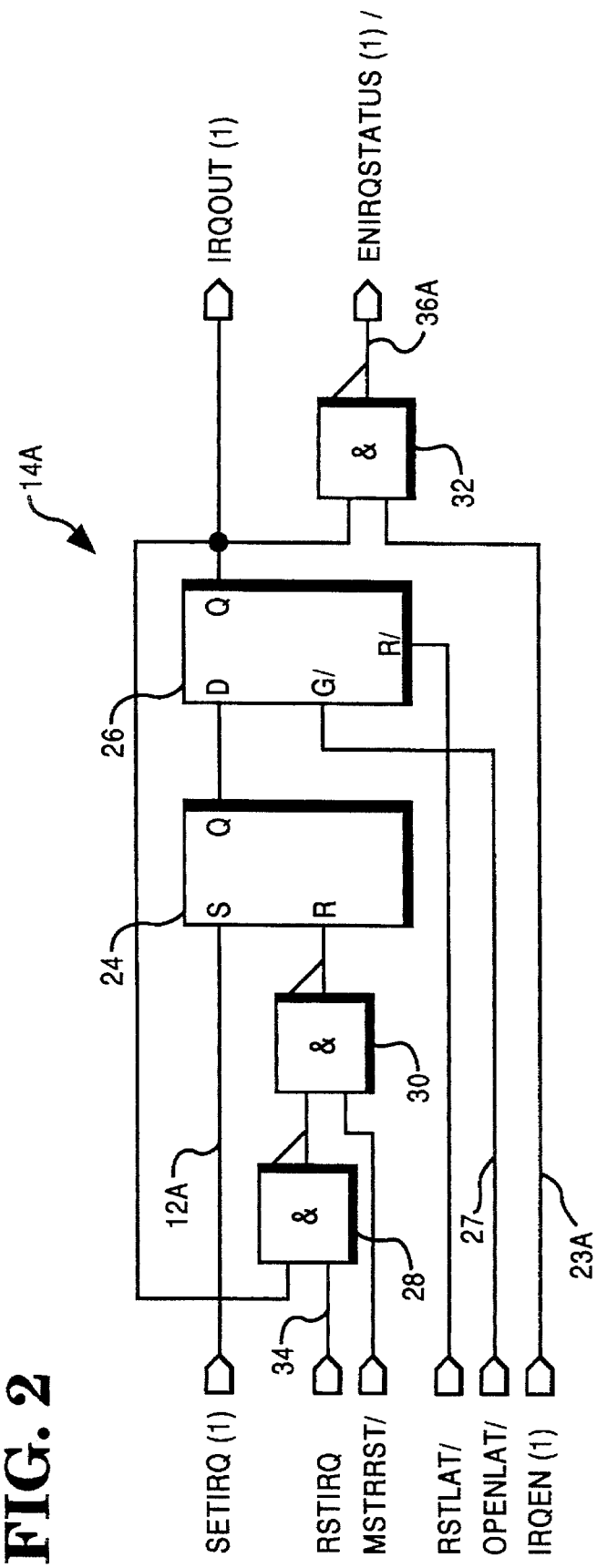
FIG. 2 is a circuit diagram of one register queue shown in FIG. 1.

FIG. 2 shows an exemplary queue 14a of register queues 14 which is connected to a single signal line 12a for receiving a single interrupt signal SETIRQ(1). It should be clear that register queue 14 includes a plurality of like elements to those shown in FIG. 2, one queue corresponding to each interrupt signal SETIRQ(X). Queue 14a includes a secondary register or SR latch 24 and a primary register or gated latch 26, with latch 24 connected between signal line 12a and latch 26. More particularly, the set input S of SR latch 24 is connected to signal line 12a for receiving SETIRQ(1). The SETIRQ(1) signal is also provided to the D input of latch 26 through the Q output of latch 24. The SETIRQ(1) signal is stored in primary register 26 in response to an OPENLAT/signal on its control gate G/ received from decoder 16 over line 27. The stored signal is provided on the Q output of latch 26 as the IRQOUT(1) signal. Queue 14a also includes 2-input coincidence gates in the form of NAND gates 28, 30 and 32. One input of NAND gate 28 is connected to the Q output of latch 26, and another input is connected to line 34 from controller 22 for receiving a reset signal RSTIRQ. The output of NAND gate 28 is provided to the reset R input of latch 24 through NAND gate 30. One input of NAND gate 30 is connected to the output of NAND gate 28, and another input receives the master reset signal MSTRRST/. The output of NAND gate 30 is connected to the reset R input of latch 24. One input of NAND gate 32 is connected to the Q output of latch 26, and the other input is connected to a single signal line 23a of lines 23 for receiving a single masking signal IRQEN(1), as will be described more fully. The output of NAND gate 32 provides a status bit ENIRQSTATUS(1)/ to decoder 16 over a single bit line 36a of a connector 36. As noted previously queue 14a is but one of a plurality-of data bit queues contained within register queues 14. Since each queue is connected to a different input line 12 for receiving a different one of the interrupt signals SETIRQ(X), there is a primary and secondary register associated with each input line.

Figure 3:
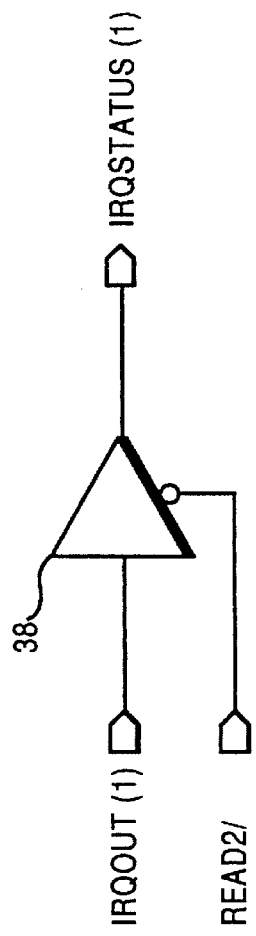
FIG. 3 is a circuit diagram of one status register shown in FIG. 1.

Status registers 20 include a number of tristate gates, such as tristate gate 38 shown in FIG. 3. Tristate gate 38 receives the IRQOUT(1) signal from the Q output of primary register 26 (FIG. 2). Tristate gate 38 responds to the READ2/ signal by transferring the IRQOUT(1) input signal to its output as the IRQSTATUS(1) signal. There is a tristate gate connected to the output of each primary register 26.

Figure 4:
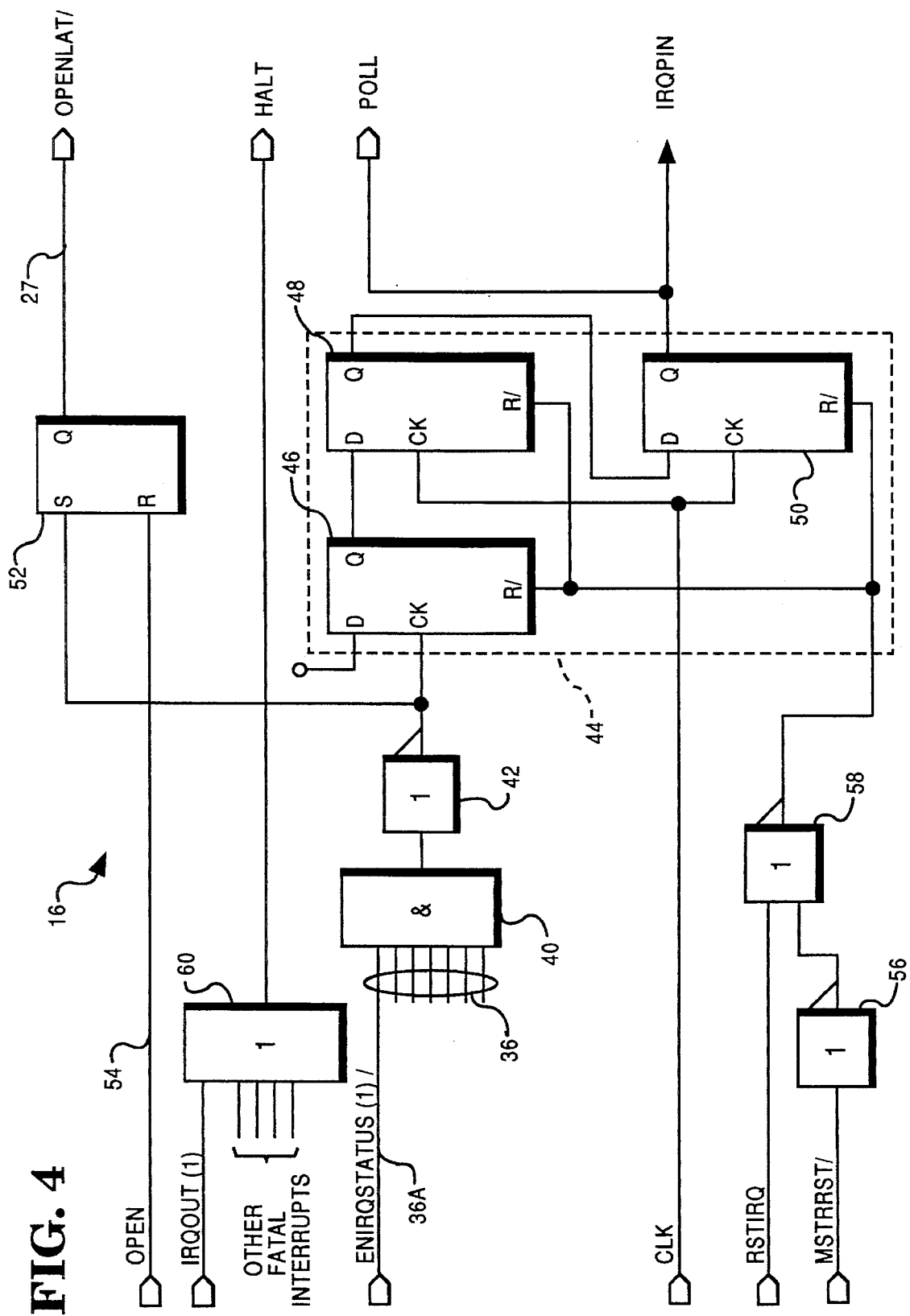
FIG. 4 is a circuit diagram of the decoder shown in FIG. 1.

FIG. 4 shows greater detail of decoder 16. In general, decoder 16 is connected between the Q output of each primary register of register queues 14 and the G/gate of each such primary register. Decoder 16 receives the ENIRQSTATUS(X)/ signals from the Q outputs of primary registers 26 (FIG. 2) through NAND gate 32, provides to the system processor notice (IRQPIN) of stored signals in response, and changes the OPENLAT/signal to the G/input of primary registers 26 to close the primary registers to subsequently received SETIRQ(X) signals.

More particularly, decoder 16 includes a multiple input coincidence gate in the form of AND gate 40, an inverter 42 and synchronizer circuit 44 series connected between connector 36 and the output line for the IRQPIN signal. The inputs of AND gate 40 are connected through NAND gates 32 to the Q outputs of primary registers 26 (FIG. 2), and receive the ENIRQSTATUS(X)/ signals therefrom. The output of AND gate 40 provides a notice signal indicating stored interrupt signals, such notice signal being provided as the IRQPIN signal after being inverted and synchronized. Inverter 42 inverts the notice signal and synchronizer circuit 44 synchronizes the inverted notice signal to a system clock signal CLK. The output of AND gate 40 is connected to the input of inverter 42. Synchronizer circuit 44 includes latches or D-type flip-flops 46, 48 and 50. The D input of flip-flop 46 is connected to a high voltage source, its clock input CK is connected to the output of inverter 42, and its Q output is connected to the D input of flip-flop 48. The Q output of flip-flop 48 is connected to the D input of flip-flop 50, and the clock inputs CK of both flip-flops 48 and 50 are connected to a system clock signal CLK. The Q output of flip-flop 50 provides the IRQPIN signal. Decoder 16 also includes inverter 56 and NOR GATE 58. The input of inverter 56 receives the master reset signal MSTRRST/and its output is connected to one of the inputs of NOR GATE 58. The other input of NOR GATE 58 receives a RSTIRQ signal from controller 22. The output of NOR GATE 58 is provided to the reset inputs R/of flip-flops 46, 48 and 50.

Decoder 16 further includes an SR latch 52 and an OR gate 60. The set input S of latch 52 is connected to the output of AND gate 40 through inverter 42, its reset input is connected to line 54 from controller 22 and receives the OPEN signal, and its Q output provides the gate control signal OPENLAT/ to the gates of primary registers 26. OR gate 60 receives IRQOUT(X) signals which have been predetermined to be fatal interrupts. In the embodiment shown, the Q output of primary register 26 from queue 14a has been hardwired to one of the input of OR gate 60, thereby identifying its IRQOUT(1) signal as a fatal interrupt. The output of any other primary register 26 which will receive a fatal interrupt will be similarly hardwired as an input to OR gate 60. The output of OR gate 60 is the HALT signal.

Figure 5:
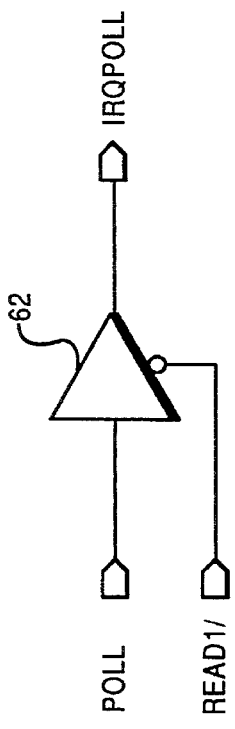
FIG. 5 is a circuit diagram of the poll register shown in FIG. 1.

FIG. 5 shows poll register 18 which includes a tristate gate 62. Gate 62 receives the POLL signal from the Q output of flip-flop 50 (FIG. 4). Tristate gate 62 responds to the READ1/signal from the system processor by transferring the POLL signal to its output as the IRQPOLL signal. The IRQPOLL signal is provided to a polling device such as the system processor.

Figure 6:
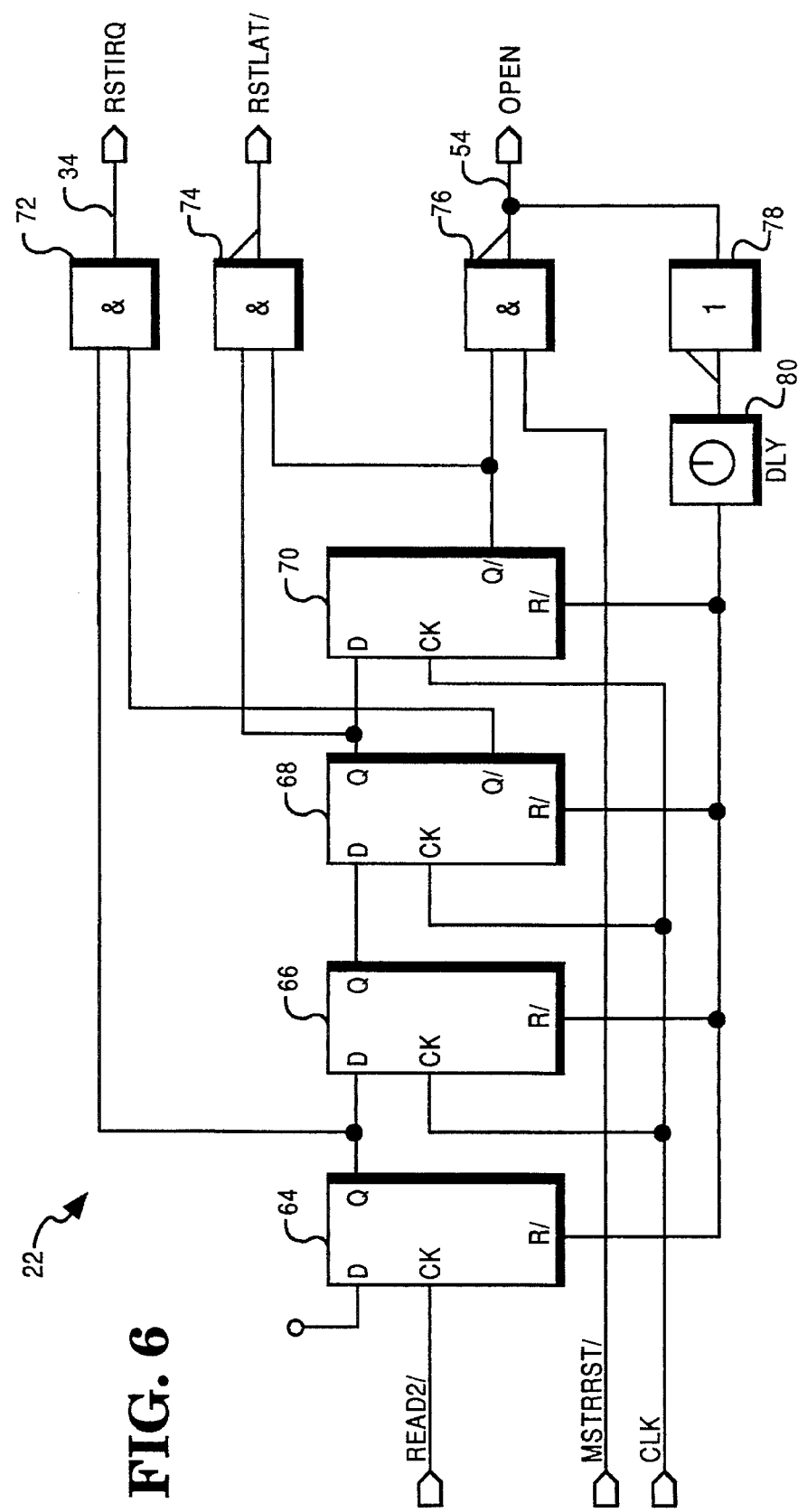
FIG. 6 is a circuit diagram of the controller shown in FIG. 1.

FIG. 6 shows controller 22 which includes series connected D-type flip-flops 64, 66, 68 and 70, AND gate 72, NAND gates 74 and 76, inverter 78, and delay element 80. Flip-flop 64 receives the READ2/ signal from the system processor on its clock input CK, and the D input of flip-flop 64 is connected to a high voltage. The Q outputs of flip-flops 64, 66 and 68 are connected to the D inputs of flip-flops 66, 68 and 70, respectively. The Q/output of flip-flop 70 is provided to line 54 through NAND gate 76. Line 54 provides an OPEN signal to decoder 16 (FIG. 4) which signals decoder 16 to open the primary registers. The other input of NAND gate 76 receives the master reset signal MSTRRST/. The Q output of flip-flop 64 and the Q/output of intermediate flip-flop 68 are provided as inputs to AND gate 72. The output line 34 of AND gate 72 provides the RSTIRQ signal to register queues 14 (FIG. 2) and decoder 16 (FIG. 4). The Q output of flip-flop 68 and the Q/output of flip-flop 70 are provided as inputs to NAND GATE 74. The output of NAND gate 74 provides the RSTLAT/signal to register queues 14. The output of NAND gate 76 is also provided through inverter 78 and delay element 80 to the reset inputs R/of flip-flops 64, 66, 68 and 70.

In operation, various secondary devices and subsystems requiring the attention of the system processor generate interrupt signals. Each such device or subsystem has a dedicated interrupt line for providing a respective interrupt signal SETIRQ(X) to a respective register such as queue 14a (FIG. 2). Each SETIRQ(X) signal received by a register queue is provided to the S input of the respective secondary register 24. The stored signal is then provided on the Q output of register 24. The OPENLAT/signal is initially active so that the signal stored in register 24 is stored in primary register 26. When the Q output of primary register 26 goes high, the output of NAND gate 32 goes low if the IRQEN(1) bit has been set. The output of AND gate 40 (FIG. 4) then goes low, and the output of inverter 42 goes high setting latch 52. The Q output of latch 52 is the OPENLAT/ signal which when deactivated and provided to the G/ gate input of primary registers 26 (FIG. 2) closes registers 26 to subsequently received SETIRQ(X) signals. The first occurring of the SETIRQ(X) interrupt signals triggers the above sequence to close all primary registers 26. However, any other SETIRQ(X) signal occurring substantially simultaneously with the first occurring signal will also be stored in a respective primary register 26 prior to the closing of the registers 26. A SETIRQ(X) signal is received "substantially simultaneously" with a first occurring of such signals if it is received within the time required to deactivate the OPEN-LAT/ signal and close primary registers 26. SETIRQ(X) signals provided to register queues 14 after primary registers 26 are closed are stored in secondary registers 24.

Notice of receipt of an interrupt signal is provided to the system processor by activating the IRQPIN signal. As noted above, the output of inverter 42, FIG. 4, is high after an interrupt signal is stored in a primary register. The inverter 42 output is applied to the CK input of flip-flop 46 which it clocks to a high value. This value is synchronized to the system clock signal CLK as it is sequentially latched into flip flops 48 and 50. The output of flip-flop 50 is the IRQPIN signal. The IRQPIN signal may be transmitted to the system processor as a synchronized interrupt signal (although synchronization may not be required in some systems). The signal is also stored in flip-flop 50 as a status bit. For systems where the processor polls device 16 for receipt of interrupt signals, flip-flop 50 may be read by the processor. This is done by a READ1/ signal being provided to tristate device 62 (FIG. 5).

Once the system processor has been notified of receipt of an interrupt signal, either through receiving the IRQPIN signal or by polling flip-flop 50, the processor reads each primary register 26 to identify each stored interrupt signal. The processor provides a READ2/signal, FIG. 3, to each tristate device 38 and receives the status of each primary register as an IRQSTATUS(X) signal. The processor can then proceed to service each interrupt. At the same time the primary registers are read, the READ2/signal is also provided to flip-flop 64, FIG. 6. The Q output of flip-flop 64 is provided to AND gate 72, the output of which is the RSTIRQ signal provided to an input of each NAND gate 28, FIG. 2. The other input of each NAND gate 28 is connected to the Q output of its respective primary register 26. The output of a NAND gate 28 will only go low when its respective primary register has a stored signal. A low output of a NAND gate 28 drives the output of NAND gate 30 high which resets secondary register 24. In this manner, only a secondary register connected to a primary register 26 with a stored signal is cleared. This preserves the contents of the other secondary registers, any of which may have received and stored an interrupt signal after the primary registers were closed. Referring back to FIG. 6, the Q output of flip-flop 68 is provided to NAND GATE 74, the output of which is the RSTLAT/signal provided to the reset R/input of all primary registers 26 (FIG. 2). This clears all the primary registers. Since the RSTLAT/ signal is generated after the RSTIRQ signal, the selected secondary registers 24 are cleared before the primary registers 26. The Q/output of flip-flop 68 and the Q/output of flip-flop 70 are provided to AND gate 72 and NAND GATE 74, respectively, to deactivate the RSTIRQ and RSTLAT/signals.

The output of NAND gate 76, FIG. 6, is the OPEN signal which is provided to the reset input of latch 52, FIG. 4, to activate the OPENLAT/signal. The OPENLAT/ signal is provided to the G/gate of each primary register 26 (FIG. 2) to reopen primary registers 26 for the storage of any interrupt signals received after the primary registers were first closed. The processing of interrupt signals can continue as described above.

Selected signals can be masked if notice of their receipt is not to be provided to the processor. This is achieved by deactivating the respective IRQEN(X) signal, FIG. 2. This keeps the output of the respective NAND gate 32 high irrespective of the output of its respective primary register 26.

Certain signals may be predetermined to be fatal interrupts. For each such signal, the Q output of its respective primary register 26 is connected to OR gate 60, FIG. 4. The output of OR gate 60 is the HALT signal which provides priority notice of receipt of a fatal interrupt.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method for processing a plurality of asynchronous interrupt signals, each signal corresponding to a respective one of a plurality of sequential registers coupled to a respective primary register, comprising:

storing the first provided of said signals in its corresponding sequential register and then in its corresponding primary register;

closing all primary registers to subsequently provided asynchronous interrupt signals;

providing notice of receipt of said first signal; and clearing each sequential register which is connected to a primary register having a stored signal, said clearing occurring after a signal is stored in said primary register.

2. The method of claim 1, further comprising the step of reading said primary registers to identify said first stored signal.

3. The method of claim 2 further comprising, prior to closing the registers:

storing a second asynchronous interrupt signal, provided substantially simultaneously with the first provided of said signals, in its corresponding register;

wherein said reading step includes identifying said first and second stored signals.

4. The method of claim 2 further comprising:

clearing said primary registers after said reading step and then opening them for receipt of subsequently received interrupt signals.

5. The method of claim 1 further comprising:

clearing said primary registers after reading said primary registers.

6. The method of claim 5 further comprising:

opening said primary registers, after clearing said primary registers, for the storage of interrupt signals provided after said closing.

7. The method of claim 1 wherein said step of providing notice includes:

generating and storing in a latch a status bit indicative of said receipt.

8. The method of claim 1 wherein said step of providing notice further includes:

reading said latch to detect the presence of said status bit.

9. The method of claim 1 further comprising:

synchronizing said notice with a system clock signal.

10. A method for processing a plurality of asynchronous interrupt signals, each signal corresponding to a respective one of a plurality of primary registers and being provided to an input of its corresponding primary register, comprising:

storing the first provided of said signals in its corresponding primary register;

closing all primary registers to subsequently provided asynchronous interrupt signals;

providing notice of receipt of said first signal;

reading said primary registers to identify said first stored signal; and providing a masking signal to a predetermined primary register prior to storing said first signal to prevent the providing of notice of receipt of the corresponding signal.

11. A method for processing a plurality of asynchronous interrupt signals comprising:

storing each signal in a respective sequential secondary register;

storing the first occurring of said signals as well as any signals occurring substantially simultaneously therewith in primary registers connected to respective sequential secondary registers;

closing the primary registers to any interrupt signals occurring after all signals in the preceding step are stored;

providing notice of receipt of said first signal by generating and storing in a latch a status bit indicative of said receipt; and reading said primary registers to identify each stored signal.

12. The method of claim 11 further comprising:

clearing each sequential secondary register which is connected to a primary register with a stored signal, said clearing occurring after a signal is stored in said primary register;

clearing said primary registers after reading said primary registers; and opening said primary registers after clearing said primary registers for the storage of interrupt signals occurring after said closing.

13. The method of claim 12 further comprising:

synchronizing said notice with a system clock signal.

14. The method of claim 13 further comprising:

providing a masking signal to a predetermined primary register prior to storing said first signal to prevent the providing of notice of receipt of the corresponding signal.

15. An apparatus for managing multiple asynchronous interrupt signals transmitted on a plurality of signal lines comprising:

a plurality of primary registers, each having an input for receiving one of said signals, a control gate for controlling the storage of the signal in the register, and an output for providing a stored signal;

a device connected between the output and the control gate of each of said registers for providing notice of a stored signal to a processor and for sending a signal, in response to the stored signal, to each control gate to close its respective register;

means connected to said outputs for receiving a read signal to read said registers; and a controller connected to said device for receiving said read signal and for signaling said device to open said registers.

16. The apparatus of claim 15 wherein said device includes a coincidence gate having multiple inputs connected to respective primary register outputs and an output.

17. The apparatus of claim 16 wherein said device further includes a circuit connected to said coincidence gate output for synchronizing said notice to a system clock signal.

18. The apparatus of claim 17 wherein said device further includes a latch connected to said coincidence gate output.

19. The apparatus of claim 15 wherein said controller includes a plurality of series connected flip-flops, wherein the first flip-flop receives said read signal and the last flip-flop is connected to said device.

20. The apparatus of claim 15 further comprising:

a plurality of secondary registers, each connected between a respective signal line and primary register input to form a register queue.

21. The apparatus of claim 20 further comprising a plurality of coincidence gates, each gate having a first input connected to the output of a respective primary register and an output connected to a reset input of a respective secondary register.

22. The apparatus of claim 21 wherein said controller includes a plurality of series connected flip-flops, wherein the first flip-flop receives said read signal and an output of the last flip-flop is connected to said device, and wherein an output of an intermediate flip-flop is connected to a second input of each of said coincidence gates.

* * * * *